(12) United States Patent
Tasker (10) Patent No.: US 8,787,358 B2
(45) Date of Patent: Jul. 22, 2014

(54) SYSTEM FOR AD-HOC COMMUNICATION SESSIONS

(75) Inventor: Michael Edric Tasker, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 401 days.

(21) Appl. No.: 13/171,083

(22) Filed: Jun. 28, 2011

(65) Prior Publication Data

US 2013/0003720 A1  Jan. 3, 2013

(51) Int. Cl.
  H04L 12/66 (2006.01)
  G01R 31/08 (2006.01)
  G06F 11/00 (2006.01)
  G08C 15/00 (2006.01)
  H04J 1/16 (2006.01)
  H04J 3/14 (2006.01)
  H04L 12/26 (2006.01)
  H04L 1/00 (2006.01)

(52) U.S. Cl.
  USPC ............ 370/352; 370/229; 370/235; 370/356

(58) Field of Classification Search
  USPC ........................................................ 370/352
  See application file for complete search history.

(56) References Cited

U.S. PATENT DOCUMENTS 6,256,515 B1 * 7/2001 Cox et al. ...................... 455/565
6,625,256 B1   9/2003 Tasker et al.
6,931,103 B1   8/2005 Tasker et al.
7,558,246 B2   7/2009 Tasker
2006/0203722 A1 * 9/2006 Oommen ....................... 370/229
2006/0285493 A1 * 12/2006 Manuja et al. ................ 370/235
2007/0201448 A1 * 8/2007 Baird et al. ................... 370/356
2007/0281704 A1 * 12/2007 Lin et al. ....................... 455/445
2008/0144615 A1 * 6/2008 Casey ........................... 370/389

OTHER PUBLICATIONS

Rosenberg, J., Network Working Group, "SIP: Session Initiation Protocol," http://toolsietf.org/html/rfc3261, published Jun. 2002.

* cited by examiner

Primary Examiner — Noel Beharry
(74) Attorney, Agent, or Firm — Brinks Gilson & Lione (57) ABSTRACT

In one implementation, a guest device on an ad hoc network is permitted to initiate a communication session through a packet switched network depending on the destination endpoint of the communication session. A network device maintains a list of approved destination endpoints, which may be identified by telephone numbers, addresses, or uniform resource identifiers. The approved destination endpoints correspond to services that are offered to users of guest devices, such as voicemail, videoconferencing, or customer service. The network device receives a request for a communication session from a guest device, and the request includes data indicative of a destination endpoint. The network device compares the data indicative of the destination endpoint to the list of approved destination endpoints. If there is a match, the request is forwarded to a next hop router. If there is no match the request is dropped or returned to the guest device.

20 Claims, 5 Drawing Sheets

SYSTEM FOR AD-HOC COMMUNICATION SESSIONS

FIELD

The present embodiments relate to session initiation protocol (SIP) calls or other communication sessions made through a packet switched network.

BACKGROUND

An "over the top" service utilizes a communication channel provided by another entity for a service that is typically provided by a communication channel specific to the service. A typical "over the top" service occurs when a user of a voice over internet protocol (VoIP) application utilizes a packet switched network to initiate a telephone call that eventually connects with the public switched telephone network (PSTN).

In some instances, users may use these over the top services to informally access the voice services of the entity providing the communication channel. For example, a user may connect as a guest to the internet through a network provided by a business and activate a VoIP application to call the business through a toll free number. The business bears the costs of the network and may also bear the toll charges associated with the toll free number.

DETAILED DESCRIPTION

Overview

In one aspect, a method includes storing a list of approved destination endpoints, storing a table of authenticated endpoints authenticated on a network, and receiving a session internet protocol (SIP) invite message at a network device, wherein the SIP invite message includes data indicative of a source endpoint and data indicative of a destination endpoint. The data indicative of the source endpoint is compared to the table of authenticated endpoints to determine whether the source endpoint is represented in the table of authenticated endpoints. If the source endpoint is represented in the table of authenticated endpoints, the SIP invite message is forwarded. If the source endpoint is not represented in the table of authenticated endpoints, the method determines whether the list of approved destination endpoints includes the data indicative of the destination endpoint. If the list of approved destination endpoints includes the data indicative of the destination endpoint, the SIP invite message is forwarded.

In a second aspect, a network device includes a memory and a controller. The memory is configured to store a list of service phone numbers. The controller is configured to identify a destination phone number from a communication session request received from a user agent device, and configured to forward the communication session request to a next hop node in response to the destination phone number being included in the list of service phone numbers and drop the communication session request or return the communication session request to the user agent device in response to the destination phone number being excluded from the list of service phone numbers.

In a third aspect, a non-transitory computer readable medium encoded with software operable to store a list of approved service phone numbers associated with an entity, receive a SIP invite message at a network device of the entity, wherein the SIP invite message includes a destination phone number, and forward the SIP invite message based on whether the destination phone number is included in the list of approved service phone numbers.

Example Embodiments

A guest device on an ad hoc network is permitted to initiate a communication session through a packet switched network depending on the destination endpoint of the communication session. A network device maintains a list of approved destination endpoints, which may be identified by telephone numbers, addresses, or uniform resource identifiers. The approved destination endpoints correspond to services that are offered to guests such as voicemail, videoconferencing, or customer service. The network device receives a request for a communication session from a guest device, and the request includes data indicative of a destination endpoint. The network device compares the data indicative of the destination endpoint to the list of approved destination endpoints. If there is a match, the request is forwarded to a next hop router. If there is no match the request is dropped or returned to the guest device. The specific list of approved destinations available to a specific user device may be dependent upon several factors including the physical type of device (a laptop, a specific brand of smartphone, etc.), the internet protocol ("IP") address and/or subnet that the user device is connected via, the type of authentication that the user device used to initially connect to the IP network, whether the device is connected via a wired or wireless connection, whether the user device is connected via a Virtual Private Network, or other factors. The list of approved destinations may be dynamic and include the destination numbers of other (guest) user devices currently connected to the network.

Guest networks have become common in many settings. Restaurants provide guest networks for free Internet access for their customers. Libraries, universities, airports, and increasingly, corporations have installed guest networks for unaffiliated or unauthorized users to connect to the internet. The guest networks are often wireless networks but may alternatively be wired networks. For example, a business may provide guest access to its wired network through Ethernet cables provided in a conference room.

Because guest networks may require no authorization or authentication, the entity providing the guest network is often motivated to limit the services available through the guest network. For example, applications that require a high quality of service may be disabled. A high quality of service may be one or more of a guaranteed bit rate, a threshold jitter rate, or a minimum delay. An example of such an application is session initiation protocol (SIP). SIP is an application-layer control protocol, which is layer 7 of the Open Systems Interconnection (OSI) model. The guest network provider may disable all SIP sessions from non-authenticated user devices (user agents). Authenticated user devices are permitted to initiate SIP sessions. Authenticated user devices may included standalone IP phones, which may be individually licensed, and strict control policies are needed to prevent the unauthorized use of resources (e.g., toll fraud).

However, third party service gateways running SIP clients (e.g., Sipdroid, etc.) or SIP-like clients (e.g., Skype, Vonage, etc.) allow the user devices to utilize the internet connection over the guest network to connect to a PSTN and dial phone numbers. If the dialed phone number is a toll free service number local to the guest network, the entity providing the guest network may incur the costs for the guest network and the cost of the toll free number. A direct connection between the toll free service number and the user device may reduce costs for the entity providing the guest network.

Figure 1:
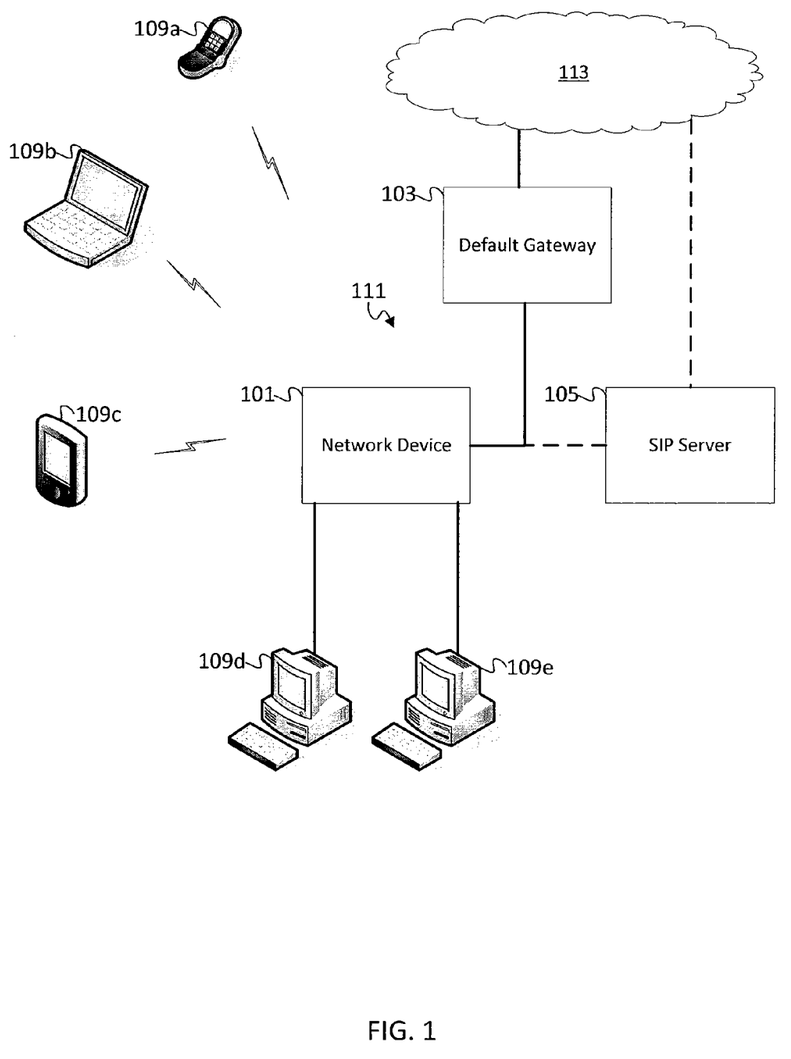
FIG. 1 illustrates one embodiment of a communication system.

FIG. 1 illustrates an example communication system for ad hoc communication sessions that selectively permit direct connection between approved numbers or endpoints and guest users. The communication system includes a network device 101, a default gateway 103, and a SIP server 105 in communication by way of network 111. Other configurations are possible, for example, one or both of the default gateway 103 and the SIP server 105 may be omitted. The communication system may also be in communication with an external network 113. The network device 101 hosts at least one user device. The user device may be a wireless device such as a phone 109a, a laptop computer 109b, and a tablet computer, a personal digital assistant, or a smart phone 109c. The user device may include only wireless network capabilities or both wireless network capabilities and cellular capabilities. Wireless network capabilities may include the protocols known as Wi-Fi, the protocols defined by the IEEE 802.11 standards, the protocols defined by the Bluetooth standards, or other protocols. The user device 109 may run Android, iOS, Blackberry OS, Windows Phone, Windows Mobile, WebOS, or another mobile operating system. The user device 109 may also be wired devices such as computers 109d and 109e.

The default gateway 103 allows user devices 109 on network 111 to communicate with computers or devices or other networks. When a user device 109 connects to the network 111 as a guest, the default gateway 103 is assigned to the user device 109. The default gateway 103 may be assigned to the user device 109 by network device 101 or discovered through Dynamic Host Configuration Protocol (DHCP). The default gateway 103 is the basic mechanism for any IP activity. When the user device 109 sends a packet but no known route exists for the packet, the packet is forwarded to the default gateway 103. No known route exists for the packet when a routing table in the network device 101 does not include an entry for the destination of the packet.

An example of a packet with no known route may be a SIP invite message from a user device 109 that has not been authenticated for communication with the SIP server 105. In this example the user device 109 also does not initially know the IP address or domain name system ("DNS") server name of the SIP server 105 that it needs to communicate with. The SIP server 105 handles the SIP session setup and tear down. The user device 109 attempts to initiate a SIP session by sending a SIP invite message to the IP address of the default gateway 103. The default gateway 103 may forward the SIP invite message to the SIP Server 105. Alternatively the SIP server 105 and the default gateway 103 functions may reside in the same physical device and have the same IP address such that no forwarding is needed. In an alternative embodiment, there may be multiple SIP servers 105 available as choices that the default gateway 103 may choose to forward the SIP invite message to. The default gateway may select between available SIP servers 105 based on various parameters such as the destination telephone number, or may select between available SIP servers 105 using a round-robin or random selection so as to provide load balancing of calls across the multiple available SIP servers 105.

The network device 101 may be an integrated services router (ISR). The ISR may connect the network 111 to a wide area network (WAN) link (not shown). In this way, the network 111 may be a local area network (LAN) in a branch office that is in communication with a main network. The ISR is configured to route packets as well as provide additional services. The additional services may include security services such as a firewall or encryption, resource reservation control mechanisms (quality of service), and virtual private networks. The ISR subjects traffic to quality of service treatment and call admission control before the traffic reaches the WAN link. Alternatively, the network device 101 may be a non-ISR router.

The user devices 109 (endpoints) are configured to initiate a communication session. The communication session may be a session initiation protocol (SIP) call, as defined by the Internet Engineering Task Force Request for Comments 3261 (RFC 3261) published June 2002. Some of the user devices 109 may be authenticated on network 111 by router 101. Some of the user devices 109 may not be authenticated on network 111 and accordingly, may be given access to only guest services on the network 111. Authentication may involve interaction with call manager software. For example, the call manager software executed by the network device 101 may request a password or other authentication key from the user device 109. The router 101 is configured to store a table of authenticated user devices (authenticated endpoints) that have been authenticated on the network 111. Alternatively, the table includes both authenticated user devices and not authenticated user devices and an indicated whether each user device has been authenticated.

The router 101 also stores a whitelist. The whitelist includes data indicative of at least one destination endpoint. The data indicative of at least one destination endpoint may be a list of approved destination endpoints. The list of destination endpoints may include phone numbers, uniform resource identifiers (URIs), or a combination thereof. Alternatively, the data indicative of at least one destination endpoint may be internet protocol (IP) addresses, machine access control (MAC) address, or any information for identifying the other endpoint of the communication session.

The data indicative of at least one destination endpoint (phone numbers or URIs) may be associated with services provided by an entity providing the network 111. For example, the entity providing the network 111 may be an employer that provides services to employees. The services may include voicemail, videoconferencing, or technical support. Each of the services may be accessed by a phone number or URI.

The user device 109 is configured to send a message to the router 101. The message may be structured as a packet, a frame, or a datagram. In one example the message is SIP invite message, including a header and a subject. The header of the SIP invite message may include data indicative of a source endpoint and the subject of the SIP invite message may include data indicative of a destination endpoint (e.g., phone number or URI). Alternatively, a URI of the destination endpoint may be included in the header.

The router 101 compares the data indicative of the destination endpoint to the whitelist of approved endpoints or phone numbers, and forwards the message if the destination endpoint is included in data representative of the list of approved endpoints or phone numbers. The router 101 may forward the message to the default gateway 103 or the SIP server 105.

Alternatively, the router 101 may perform a two-step analysis on the message. First, the router 101 may compare the data indicative of the source endpoint from the header of the message to the table of authenticated endpoints. If the source endpoint is included in the table of authenticated endpoints, the message is forwarded with no determination as to the destination of the message. However, if the source endpoint is not included in the table of authenticated endpoints, the router 101 compares the data indicative of the destination endpoint to the whitelist of approved endpoints or phone numbers. If the destination phone number is included in the whitelist, the router 101 forwards the message to initiate the communication session. If the destination endpoint is not included in the whitelist, the router 101 drops or blocks the message. The router 101 may send an error message to the user device 109 that indicates that the message was blocked.

Figure 2:
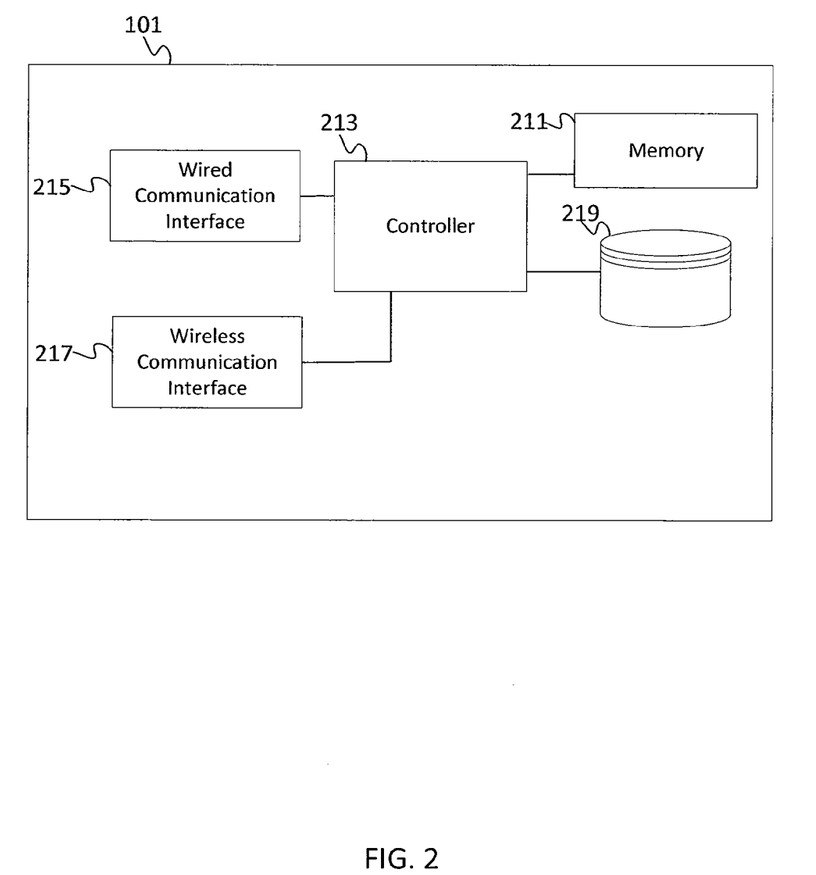
FIG. 2 illustrates an example of a network device of the communication system of FIG. 1.

FIG. 2 illustrates a detailed view of the router 101. The router 101 includes a memory 211, a controller 213, a wired communication interface 215, and a wireless communication interface 217. The router 101 communicates with the user devices 109 regardless of whether the user devices 109 are known to the router 101.

At least one of the user devices 109 is configured to connect to the network 111 as a guest. The user devices 109 receive network parameters through a protocol, such as a Dynamic Host Configuration Protocol (DHCP). The user devices may send a broadcast query message to a DHCP server. The DHCP server returns network parameters to the user devices 109. The network parameters may include an address of the default gateway 103, a domain name, and other server addresses. The user devices 109 are configured to send SIP messages to the address of the default gateway 103 by way of network device 101. Because the user device 109 is a guest, the SIP server 105 is not reachable by the user device 109 (e.g., the DHCP server did not return the address of the SIP server 105 to the user device 109).

The user device 109 generates a communication session request, such as a SIP invite message, by executing a local client. The communication session request includes data indicative of a source endpoint (user device 109), a destination phone number, a port (e.g., port 5060 may be designated for control of the communication session) and an address of the default gateway 103. Either the wired communication interface 215 or the wireless communication interface 217 receives the SIP invite message, which is processed by controller 213.

The memory 211 or database 219 stores a list of service phone numbers. The controller 213 identifies the destination phone number from a communication session request received from the user device 109. The controller 213 accesses the list of phone numbers from the memory 211 or database 219. The controller 213 compares the destination phone number to the list of phone numbers. When the destination phone number is included in the list of phone numbers, the controller 213 forwards the communication session request to a next hop node. The next hop node may be the default gateway 103 or the SIP server 105. When the destination phone number is not included in the list of phone numbers, the controller 213 may drop the communication session request. Alternatively, when the destination phone number is not included in the list of phone numbers, the controller 213 may return the communication session request or an error message to the user device 109. As a further alternative the controller 213 may forward the communication session request to a default destination or phone number such as a telephone switchboard operator or receptionist who may answer the phone call and provide assistance to the user. The controller 213 may provide the receptionist with information about the user device such as its physical or logical location in the network and its authorization or authentication status.

The controller 213 may also be configured to identify authenticated device and process the communication session request according to whether the user device 109 is authenticated. The memory 211 or database 219 stores a table of authenticated endpoints. The controller 213 may be configured to compare the data indicative of the source endpoint (user device 109) with the table of authenticated endpoints. When the source endpoint is included in the table of authenticated endpoints, the communication session request is forwarded to the next hop router. No analysis with regard to the destination phone number is necessarily performed. When the source endpoint is not included or is omitted from the table of authenticated endpoints, the communication session request is dropped or an error message may be returned to the source endpoint.

The controller 213 may assign a quality of service to a communication session associated with the communication session request. The quality of service may guarantee that packets of the communication session arrive at the destination endpoint within one or more predetermined parameters. The predetermined parameters may include a specific transmission rate, a rate of jitter, a rate of delay, a throughput, a number of dropped packets, and/or a rate of latency. The quality of service may include a plurality of levels, for example high quality of service, low quality of service, and best effort service. A best effort quality of service may be referred to as a lack of any quality of service. For example, the controller 213 may assign a best effort quality of service to over the top traffic and higher quality of service to all other traffic.

The controller 213 may be configured to redirect the communication session request to the default gateway 103 according to a moved temporarily message. The moved temporarily message may be a SIP 302 response, as defined by RFC 3261. The SIP 302 response may redirect the communication session request (SIP invite) from the user device 109 to an address of default gateway 103 associated with the user device 109. For example, a SIP client at a user device 109 at IP address 10.10.1.123 sends a SIP invite to the videoconferencing access number at uc-access@abc-company.com. The SIP invite is redirected to the user device's IP gateway address of 10.10.1.1. Accordingly call admission control and quality of service can be applied to the communication session. The call admission decision and quality of service assigned may be determined based on a number of factors such as the destination number, the physical or logical location of the user device, the physical type of the user device (e.g. a laptop or a smart phone), the type of wired or wireless connection that the user devices uses to connect to the network, or any other parameter related to the communication session.

The call admission control may be executed at network device 101 or default gateway 103. The call admission control may analyze traffic leaving the network 111. The controller 213 may be configured to compare traffic between the network 111 and a WAN link. If the traffic exceeds a threshold level of traffic, which corresponds to being incapable of accepting the communication session that would result from the communication session request, the controller 213 is configured to re-route the call into another call network system such as the PSTN by way of the destination phone number included in the communication session request. The destination phone number may need to be modified to make it routable by the PSTN (for example to prepend appropriate PSTN access digits to the phone number such as the digits "9" or "9-1". This strategy may involve a toll charge for the destination phone number but avoids loading the WAN link and introducing lower quality audio into the service.

The controller 213 is configured to communicate with more than user device 109. The controller 213 may receive a second communication session request and handle the second communication session request in a similar manner to the first communication session request. In one implementation, the controller 213 may identify a situation in which the first communication session request and the second communication session request include data indicative of the same destination endpoint. The controller 213 may identify that the two communication session requests involve the same destination endpoint by sniffing digits of a meeting or conference number.

If this occurs, the controller 213 may consolidate the two communication sessions into a single stream of data. In other words, the network device 101 may perform audio and/or video stream optimization by locally mixing or switching the data from all of the local participants. The single consolidated stream may be sent to the external network 113 or the PSTN. The network device 101 may also modify the voice codec for the communication session to reduce the bandwidth. For example, the controller 213 may force the communication session to use G.729 (audio data compression), as published in 2009 by the International Telecommunication Union Telecommunication Standardization Sector (ITU-T) instead of G.711 (pulse code modulation), as published by ITU-T in 1989.

Figure 3:
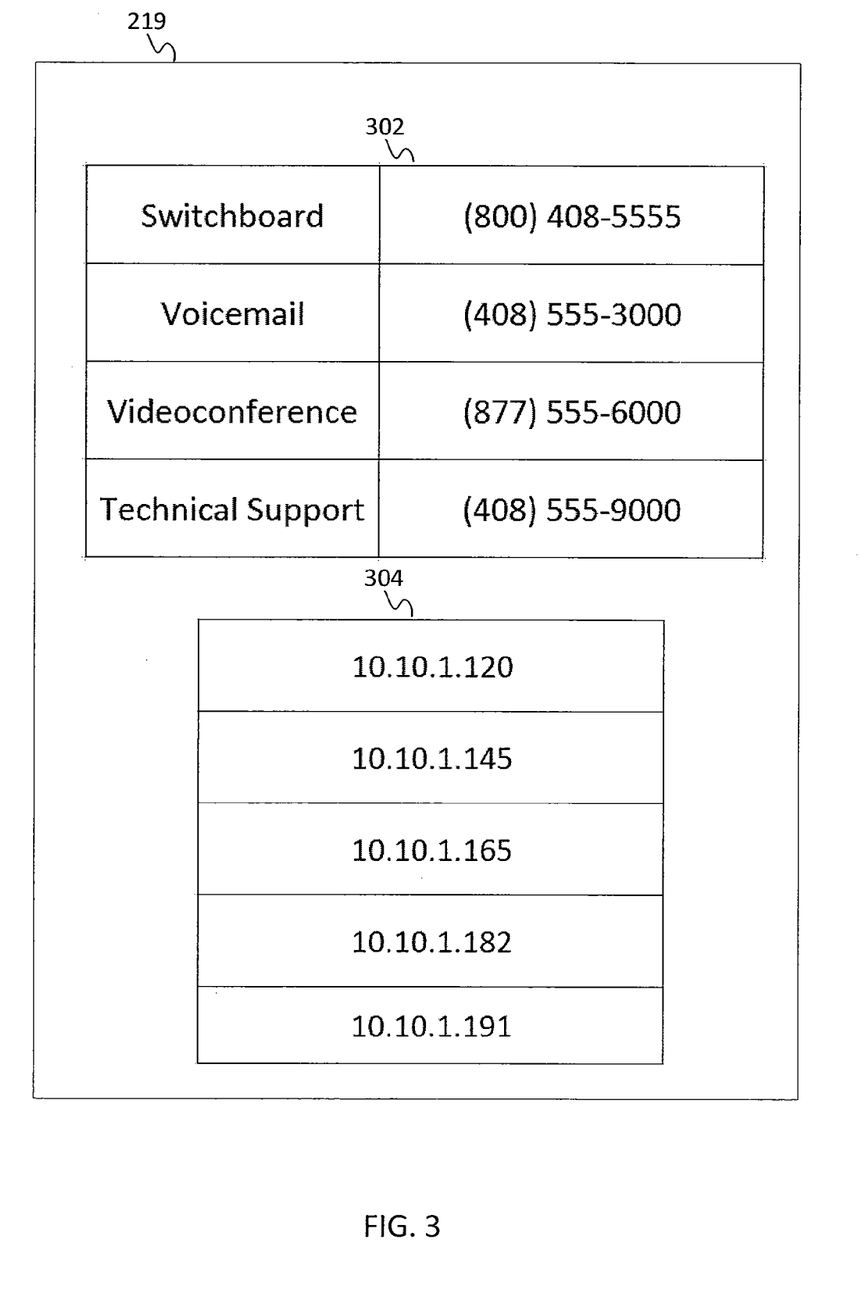
FIG. 3 illustrates an example of a white list of the network device of FIG. 2.

FIG. 3 illustrates an example of database 219. The database includes the list of approved destination endpoints or approved phone numbers 302 and the table of authenticated endpoints 304. The list of approved destination endpoints or approved phone numbers 302 may be associated with services provided by a company or other entity that provides the network 111. For example, the entity providing the network 111 may be an employer that provides services to employees. The services may include a switchboard, a voicemail, videoconferencing (e.g., Cisco Webex), or technical support. Each of the services may be accessed by a phone number or URI. The list of approved destination endpoints or approved phone numbers 302 may be specific to a particular user device 109. The network device 101 may generate the list based on the type of user device 109. For example, tablet computers and laptop computers may be given access to different destination endpoints than smart phones because smart phones also include cellular capability and can initiate calls without a connection to the network 111. The network device 101 may generate the list based on the connection with user device 109. For example, a user device 109 known to be a secure location or connection may be given access to different destination endpoints than wireless or unsecured connections. The network device 101 may make similar distinctions based on IP address, subnet, or virtual private network (VPN). The list of approved destination endpoints or approved phone numbers 302 may include the destination numbers of other user devices currently connected to the network or to the network device 101, including guest user devices.

The table of authenticated endpoints 304 includes addresses (IP, MAC, etc.) of local user devices 109 that have completed the authentication processes. The table of authenticated endpoints 304 may also include the authentication keys. The user devices 109 that have completed the authentication processes are allowed to directly initiate communication session with all destination endpoints or at least a set of destination endpoints greater than that included in the list approved destination endpoints or approved phone numbers 302. Alternatively, the list of approved destination endpoints or approved phone numbers 302 and the table of authenticated endpoints 304 could be stored by memory 211.

Figure 4:
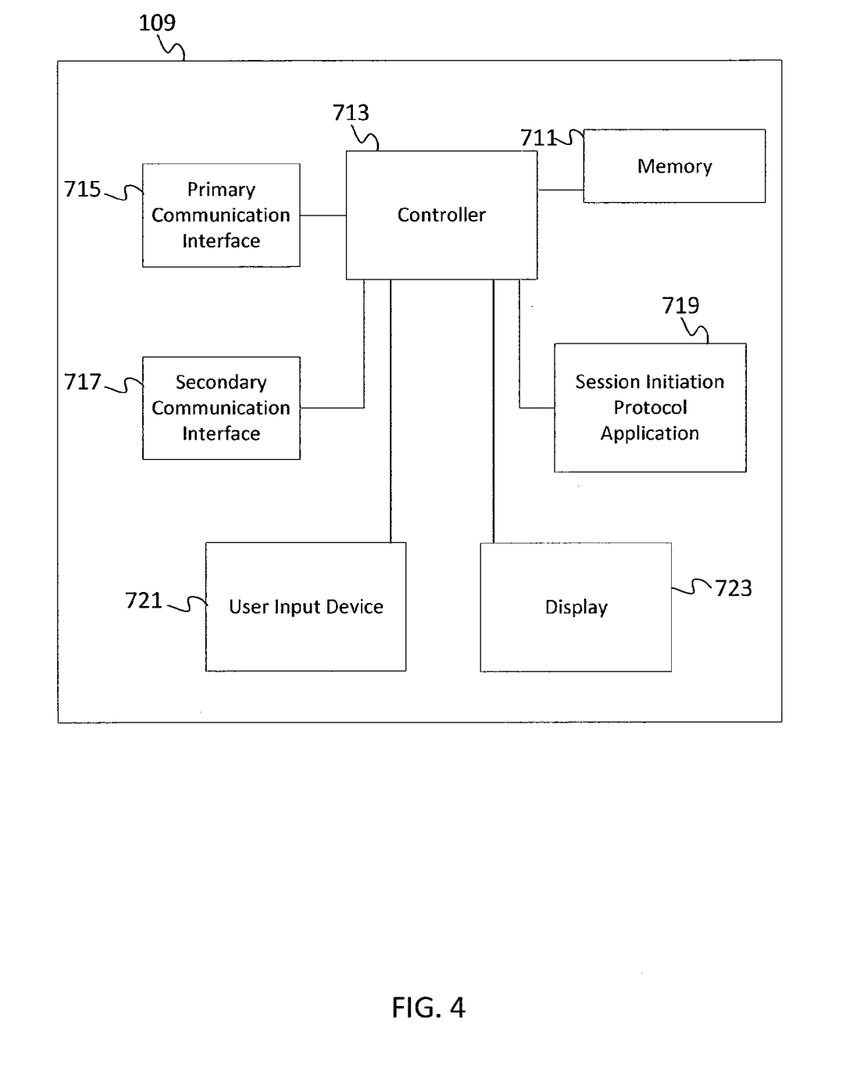
FIG. 4 illustrates an example of a user device in the communication system of FIG. 1.

FIG. 4 illustrates an example of a user device 109 in the communication system of FIG. 1. The user device 109 includes a memory 711, a controller 713, a primary communication interface 715, a secondary communication interface 717, a session initiation protocol (SIP) application 719, a user input device 721, and a display 723.

The primary communication interface 715 may be a cellular or other long-range communication interface, and the secondary communication interface 717 may be a short-range communication interface, such as Wi-Fi or Bluetooth. The controller 713 executes a SIP protocol application 719, which may be stored in memory 711, to generate a communication session request. The communication session request is transmitted to the network 111 by way of communication between the network device 101 and the secondary communication interface 717. The user may interact with user input device 721, which may be combined as a touch screen with display 723, to load the SIP application and select the destination endpoint.

The memory 211 or memory 711 may be any known type of volatile memory or a non-volatile memory. The memory 211 or memory 711 may include one or more of a read only memory (ROM), dynamic random access memory (DRAM), a static random access memory (SRAM), a programmable random access memory (PROM), a flash memory, an electronic erasable program read only memory (EEPROM), static random access memory (RAM), or other type of memory. The memory 211 or memory 711 may include an optical, magnetic (hard drive) or any other form of data storage device. The memory 211 or memory 711 may be located in a remote device or be removable, such as a secure digital (SD) memory card.

The memory 211 or memory 711 may store data and computer executable instructions for filtering and routing communication session requests. The controller 213 or controller 713 may execute computer executable instructions. The computer executable instructions may be included in computer code. The computer code may be written in any computer language, such as C, C++, C#, Java, Pascal, Visual Basic, Perl, HyperText Markup Language (HTML), JavaScript, assembly language, extensible markup language (XML) and any combination thereof.

The computer code may be stored in one or more tangible media or one or more non-transitory computer readable media for execution by the controller 213 or controller 713. A computer readable medium may include, but is not limited to, a floppy disk, a hard disk, an application specific integrated circuit (ASIC), a compact disk CD, other optical medium, a random access memory (RAM), a read only memory (ROM), a memory chip or card, a memory stick, and other media from which a computer, a processor or other electronic device can read.

The controller 213 or controller 713 may include a general processor, digital signal processor, application specific integrated circuit, field programmable gate array, analog circuit, digital circuit, server processor, combinations thereof, or other now known or later developed processor. The controller 213 or controller 713 may be a single device or combinations of devices, such as associated with a network or distributed processing. Any of various processing strategies may be used, such as multi-processing, multi-tasking, parallel processing, remote processing, centralized processing or the like. The controller 213 or controller 713 may be responsive to or operable to execute instructions stored as part of software, hardware, integrated circuits, firmware, micro-code or the like.

The communication interfaces 715 and 717 may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other or through one or more intermediate entities (e.g., processor, operating system, logic, software). Logical and/or physical communication channels may be used to create an operable connection. Alternatively, the I/O interfaces 715 and 717 may be implemented using a single communication interface. As used herein, the phrases "in communication" and "coupled" are defined to mean directly connected to or indirectly connected through one or more intermediate components. Such intermediate components may include both hardware and software based components.

Figure 5:
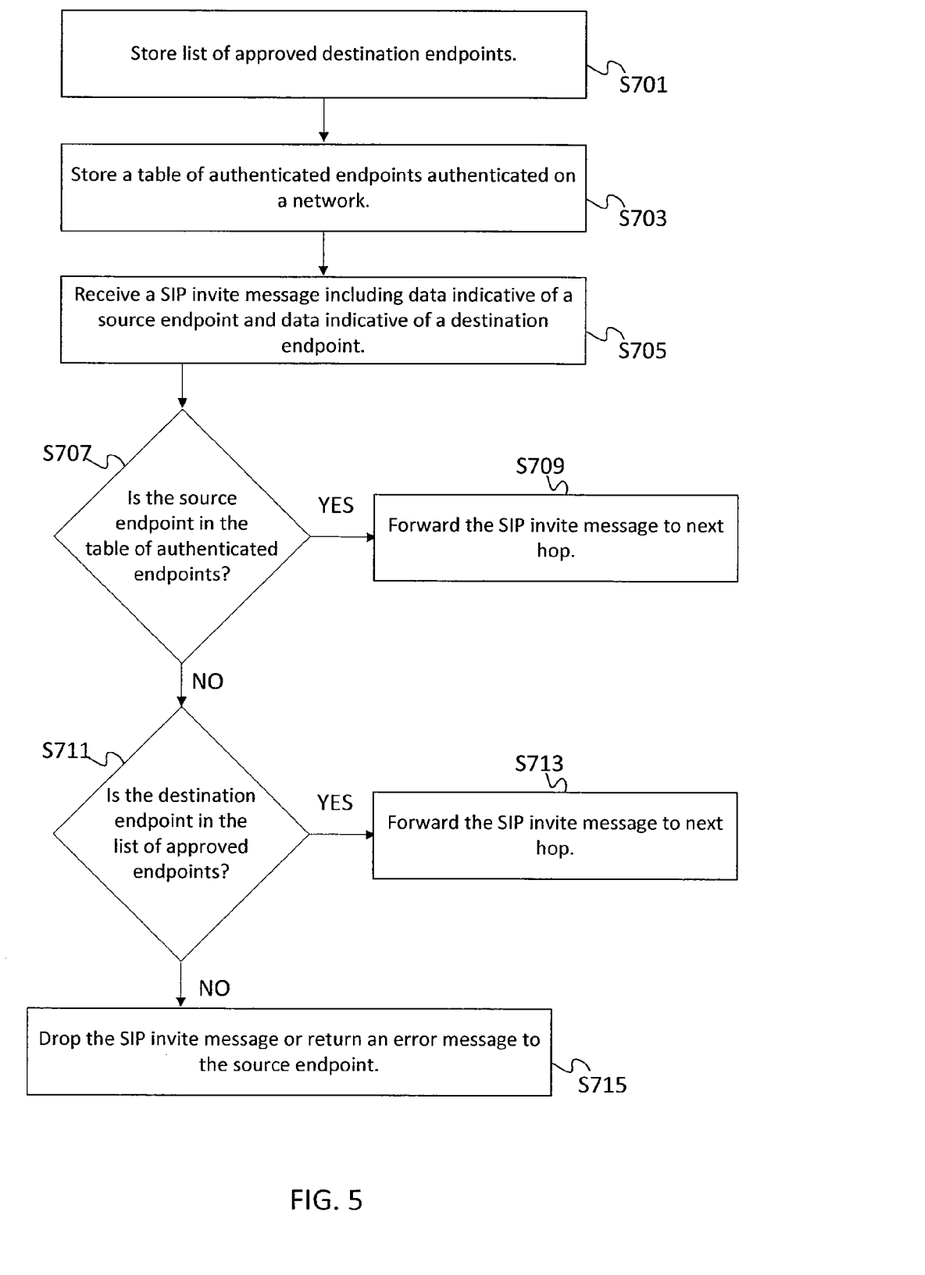
FIG. 5 illustrates one embodiment of a flow chart for ad-hoc communication sessions.

FIG. 5 illustrates one example embodiment of a flow chart for ad-hoc communication sessions. At act S701 the network device 101 stores a list of approved destination endpoints, and at act S703 the network device 101 stores a table of authenticated endpoints authenticated on a network. The network device 101 communicates with a plurality of local endpoints. One or more of the local endpoints generate a SIP invite message. At act S703, the network device 101 receives the SIP invite message, which includes data indicative of the source endpoint that generated the SIP invite message and data indicative of a destination endpoint that the source endpoint desires to communication with. The data indicative of a destination endpoint may include phone numbers, network addresses, or both.

The network device 101 processes the header and/or subject of the SIP invite message to retrieve the data indicative of the source endpoint. At S707, the network device 101 determines if the source endpoint is represented in the table of authenticated endpoints. If the source endpoint is identified in the table of authenticated endpoints, then the source endpoint is authorized for SIP services. Accordingly, at act S709, the network devices forwards the SIP invite message to the next hop. The SIP invite message results in a direct connection between the source endpoint and the destination endpoint. The direct connection may utilize video, audio, a real time protocol, or any streaming media.

If the source endpoint is not represented in the table of authenticated endpoints, then the network device 101 determines whether the destination endpoint is represented in the list of approved endpoints at act S711. The list of approved endpoints may include, but is not limited to, those endpoints that provide public or pseudo-public services to users on the network. For example, public services may include any phone number or endpoint that is accessible by the public, such as the toll free phone numbers associated with technical support, customer service, a voicemail service, or a videoconferencing service. If the destination endpoint is represented in the list of approved endpoints, the network device 101 may forward the SIP invite message to the next hop at act S713. If the destination endpoint is not represented in the list of approved endpoints, the network device 101 drops the SIP invite message or returns an error message to the source endpoint at act S715. Alternatively or in addition, the network device 101 may assign a first quality of service (higher quality of service) to packets associated with the communication session resulting from the SIP invite message when the destination endpoints is represented in the list of approved endpoints and a second quality of service (lower quality of service) to packets associated with the communication session resulting from the SIP invite message when the destination endpoint is not represented in the list of approved endpoints.

Various embodiments described herein can be used alone or in combination with one another. The foregoing detailed description has described only a few of the many possible implementations of the present embodiments. For this reason, this detailed description is intended by way of illustration, and not by way of limitation.

I claim:

1. A method comprising:
   storing a list of approved destination endpoints, wherein the approved destination endpoints provide access to a secured network for a source endpoint regardless of whether the source endpoint has been authenticated on the secured network;
   storing a table of authenticated source endpoints authenticated on the secured network;
   receiving a session internet protocol (SIP) invite message at a network device of the secured network, wherein the SIP invite message includes data indicative of the source endpoint and data indicative of a destination endpoint;
   comparing the data indicative of the source endpoint to the table of authenticated source endpoints to determine whether the source endpoint is represented in the table of authenticated source endpoints;
   forwarding the SIP invite message to the destination endpoint, if the source endpoint is represented in the table of authenticated source endpoints;
   comparing the list of approved destination endpoints to the data indicative of the destination endpoint to determine whether the destination endpoint is represented in the list of approved destination endpoints, if the source endpoint is not represented in the table of authenticated source endpoints; and
   forwarding the SIP invite message to the destination endpoint, if the destination endpoint is represented in the list of approved destination endpoints.

2. The method of claim 1, further comprising: dropping the SIP invite message, if the list of approved destination endpoints omits the data indicative of the destination endpoint.

3. The method of claim 1, further comprising:
   receiving authentication keys from a plurality of source endpoints; and
   generating the table of authenticated source endpoints based on the authentication keys.

4. The method of claim 1, wherein the list of approved destination endpoints includes a phone number or a uniform resource indicator, wherein the approved destination endpoints are associated with services provided by an entity, and wherein the secured network is also associated with the entity.

5. The method of claim 1, further comprising: assigning a quality of service to the SIP invite message, wherein the quality of service is greater than a best effort quality of service.

6. The method of claim 5, further comprising: assigning the best effort quality of service to over-the-top traffic.

7. The method of claim 1, wherein the list of approved destination endpoints includes at least one phone number selected from a group consisting of a voicemail service phone number and a videoconference service phone number.

8. The method of claim 1, further comprising: redirecting the SIP invite message to a default gateway address through a moved temporarily SIP message.

9. The method of claim 1, further comprising:
comparing traffic between the secured network and a wide area network to a threshold level of traffic; and
initiating a call with a public switched telephone network to a destination phone number included in the data indicative of the destination endpoint, if the traffic between the secured network and the wide area network exceeds the threshold level of traffic.

10. A network device, comprising:
a storage device, configured to:
store a list of approved service phone numbers, wherein the approved service phone numbers provide access to a secured network for a user device regardless of whether the user device has been authenticated on the secured network; and
store a table of authenticated user devices authenticated on the secured network; and
a controller communicatively coupled to the storage device, configured to:
receiving a session internet protocol (SIP) invite message, wherein the SIP invite message includes data indicative of the user device and data indicative of a service phone number;
comparing the data indicative of the user device to the table of authenticated user devices to determine whether the user device is represented in the table of authenticated user devices;
forwarding the SIP invite message to the service phone number, if the user device is represented in the table of authenticated user devices;
comparing the list of approved service phone numbers to the data indicative of the service phone number to determine whether the service phone number is represented in the list of approved service phone numbers, if the user device is not represented in the table of authenticated user devices; and
forwarding the SIP invite message to the service phone number, if the service phone number is represented in the list of approved service phone numbers.

11. The network device of claim 10, wherein the service phone number is a first service phone number, wherein the SIP invite message is a first SIP invite message, wherein the user device is a first user device, and wherein the controller is further configured to:
identify a second service phone number from a second SIP invite message received from a second user device; and
consolidate a first communication session resulting from the first SIP invite message and a second communication session resulting from the second SIP invite message into a single data stream.

12. The network device of claim 10, wherein each of the service phone numbers in the list of service phone numbers is associated with at least one service.

13. The network device of claim 12, wherein the at least one service is voicemail.

14. The network device of claim 12, wherein the at least one service is videoconferencing.

15. The network device of claim 12, wherein the at least one service is customer service.

16. The network device of claim 10, wherein the controller is further configured to: assign a first quality of service to packets associated with the SIP invite message, in response to the service phone number being included in the list of service phone numbers.

17. The network device of claim 10, wherein the controller is further configured to: redirect the SIP invite message to a default gateway address through a moved temporarily message.

18. A non-transitory computer readable medium encoded with computer executable instructions executable to:
store a list of approved destination endpoints, wherein the approved destination endpoints provide access to a secured network for a source endpoint regardless of whether the source endpoint has been authenticated on the secured network;
store a table of authenticated source endpoints authenticated on the secured network;
receive a session internet protocol (SIP) invite message at a network device of the secured network, wherein the SIP invite message includes data indicative of the source endpoint and data indicative of a destination endpoint;
compare the data indicative of the source endpoint to the table of authenticated source endpoints to determine whether the source endpoint is represented in the table of authenticated source endpoints;
forward the SIP invite message to the destination endpoint, if the source endpoint is represented in the table of authenticated source endpoints;
compare the list of approved destination endpoints to the data indicative of the destination endpoint to determine whether the destination endpoint is represented in the list of approved destination endpoints, if the source endpoint is not represented in the table of authenticated source endpoints; and
forward the SIP invite message to the destination endpoint, if the destination endpoint is represented in the list of approved destination endpoints.

19. The non-transitory computer readable medium of claim 18, wherein the list of approved destination endpoints includes a phone number or a uniform resource indicator, wherein the approved destination endpoints are associated with services provided by an entity, and wherein the secured network is also associated with the entity.

20. The non-transitory computer readable medium of claim 18, further comprising: assigning a quality of service to the SIP invite message.

* * * * *